United States Patent [19]

Clarke

[11] Patent Number: 4,559,074

[45] Date of Patent: Dec. 17, 1985

[54] WATER ABSORBING POLYMERS

[75] Inventor: John B. Clarke, Bradford, England

[73] Assignee: Allied Colloids Limited, England

[21] Appl. No.: 520,786

[22] Filed: Aug. 5, 1983

[30] Foreign Application Priority Data

Aug. 17, 1982 [GB] United Kingdom ................ 8223669
Mar. 21, 1983 [GB] United Kingdom ................ 8307696

[51] Int. Cl.$^4$ ............................................. C05F 11/02
[52] U.S. Cl. ........................................ 71/24; 71/27;
71/903; 47/DIG. 7; 525/296; 526/306
[58] Field of Search ................ 71/27, 1, 24, 903, 904;
526/306; 525/296; 47/86, DIG. 7

[56] References Cited

U.S. PATENT DOCUMENTS

| | | | |
|---|---|---|---|
| 3,973,355 | 8/1976 | McKenzie | 47/86 X |
| 4,172,066 | 10/1979 | Zweigle et al. | 526/306 |
| 4,254,008 | 3/1981 | Krsek | 260/33.4 R |

*Primary Examiner*—Ferris H. Lander
*Attorney, Agent, or Firm*—Lawrence Rosen

[57] ABSTRACT

Substantially non-ionic polyacrylamide cross linked with a low amount of cross linking agent is used as an additive for a plant growth medium.

18 Claims, No Drawings

WATER ABSORBING POLYMERS

This invention relates to plant growth compositions comprising a porous growth medium and water swellable water insoluble polymeric material. It is known that the inclusion of such material can improve the water retention and other properties of the growth medium, with the result that the ultimate composition is more effective for plant growth than the medium without the polymeric addition.

Polyethylene oxide that has been cross linked under the influence of ionising radiation is exemplified for this purpose in U.S. Patent Specification No. 3,336,129, which also mentions the possibility of using polyacrylamide and copolymers of acrylamide and acrylic acid. Polyalkylene oxide chemically cross linked by 0.5 to 12% cross linking agent is described in U.S. Pat. No. 3,734,876. Water insoluble cross linked anionic acrylamide copolymers are described as water retention aids for soils in British Patent Specification No. 2 054 706A and in European Patent Specification No. 0 037 138. The cross linking agent is N,N-methylenebisacrylamide and the only amount mentioned in the British specification is 5% by weight based on the weight of polymer whilst in the European specification the amount used in the examples is 5% but a range of 1 to 11% is mentioned. As the acrylamide copolymers are described as anionic it follows that they contain anionic groups, presumably acrylic acid groups.

Other publications have recommend highly ionic polymers. For instance in British Patent Specification No. 1 591 415 certain polyelectrolytes are recommended and in two publications that have appeared after the priority date of this application, PCT Publications Nos. 83/00482 and 83/00498, the use is described of copolymers of acrylamide and acrylic acid salt in molar ratio 70:30 to 95:5 cross linked such that less than 30% by weight of the dry polymer is water soluble and the gel can absorb releasably at least 15 times its own weight. Other products mentioned in these specifications are Viterra 2, which is described as a very lightly cross-linked 70:30 polyacrylamide potassium acrylate copolymer, and Agrohyd G12H which is said to be a very heavily cross linked polyacrylamide containing not more than 5% molar acrylate groups due to hydrolysis of the acrylamide. I believe Agrohyd G12H to be a product in accordance with British Patent Specification No. 2 054 706A.

The emphasis throughout all these documents is on obtaining high water absorption. For instance in PCT Publication No. 83/00498 it is stated that Viterra 2 has outstanding ability to absorb moisture but it is rejected because it has a very high content of water soluble material due to inadequate cross linking. Agrohyd G12H is rejected because its ability to absorb moisture is low, probably due to the heavy cross linking. The products of specification No. 83/00498 are said to provide an effective balance of properties between these two extremes. The particular materials exemplified in that specification as giving these desirable properties are copolymers of acrylamide with acrylic acid cross linked with methylenebisacrylamide in which the amount of acrylic acid and cross linker are, respectively, in Example 1 25% and 1200 ppm, in Example 2 10% and 500 ppm and in Example 6 from 0 to 50% and 1000 ppm. The object in that specification is to improve "retention" which is defined as the amount of aqueous phosphate-containing plant nutrient solution absorbed by the polymer. It is stated that retention improves with increasing proportion of acrylic acid in the polymer and the evidence in the specification shows that the acrylamide homopolymer cross linked with 1000 ppm cross linker does have very poor "retention".

The current state of the art therefore has been to aim for polymers having a soluble component and having the maximum absorption (or retention) of aqueous solution applied to it and it has been recognised that acrylamideacrylate copolymers are more effective.

I have now appreciated that these assumptions are wrong and that maximum water absorbtion by the polymer is not usually associated with optimum results in the field. Firstly, the meaningful water absorption values are those recorded in soil, rather than in the laboratory, because of the ionic conditions that prevail in the soil. Secondly, the highest water absorption values are often accompanied by physical instability with the result that the polymer particles break down into powder during repeated soaking and drying. Thirdly, the presence of soluble ionic components may be toxic against plant growth, particularly in the seedling stage. Fourthly, and most importantly, the critical property that is essential is not the water absorption by the polymer but is the difference between the water absorption by the polymer and the water maintenance by the polymer. The water absorption by the polymer is the amount of water that is absorbed by the polymer when soil in which it is mixed is soaked with water. The water maintenance value is the amount of water that is held by the polymer when plants growing in the soil containing the polymer start to wilt. Thus, it is an indication of how much water is held trapped in the polymer in the soil. High water absorption is often associated with high water maintenance and the water that is maintained in the polymer during drought conditions is of no value for plant growth.

It has been my object to devise an additive for a plant growth medium that gives improved results compared to the known additives, and in the invention I have achieved this partly as a result of the improved understanding described above of the properties that are required of such an additive.

A composition according to this invention for use as an additive to plant growth media is a particulate, substantially non-ionic, polyacrylamide cross linked by about 10 to about 600 ppm, by weight polymer, of cross linking agent.

The polymer must not contain significant amounts of anionic or cationic groups. For instance the total amount of such groups, including those formed by incidental hydrolysis of the monomer or polymer, should be not more than 4% molar and preferably is not more than 2% molar. Generally the total amount is from 0 to 1% molar.

The polymer is preferably formed from acrylamide alone (together with cross-linking agent) but it may also be formed from a mixture of acrylamide and other non-ionic ethylenically unsaturated monomers, for instance methacrylamide or polyvinylpyrrolidone or polyalkylene oxide. The total amount of such other monomers is generally below 25% molar.

For best results, the amount of cross linking agent should be between 20 and 500 ppm. Generally the amount is below 300, preferably below 200 and most preferably below 100 ppm. Generally, the amount is above 30 ppm. Particularly good results are achieved at cross linker levels of about 50 ppm, for instance in the range 30 to 80 ppm.

The preferred additive is polyacrylamide homopolymer (made by polymerising commercially pure acrylamide) cross linked with about 50 ppm cross linking agent.

The cross linking agent is generally methylenebisacrylamide (MBA) but similar amounts of other cross linking agents can be used instead. Generally, the cross linking agent will be water soluble as the polymer is generally made in solution.

The polymer particles may be made by known methods. For instance they may be made by inverse suspension or emulsion polymerisation, followed by separation of the dried particles, but most preferably they are made by gel polymerisation followed by comminution. The gel may be comminuted and then dried or it may be dried and then comminuted. The particles generally have a size less than 5 mm and generally less than 3 or 2 mm. In general, it is desirable for the particles to be as small as possible but if they are too small, dusting may be a problem during handling and so generally the particles are at least 0.05 mm in size. Preferred materials have a particle size of from 0.05 to 1, most preferably 0.05 to 0.5 mm.

When the polymer particles used in the invention are swollen with water they are generally tough but sticky, whereas more highly cross linked polymers are much less sticky. It is known that cross linked polymers generally contain some soluble material but it seems that in the invention the low level of cross linking leads to a particularly desirable combination of insoluble and soluble contents and that this in turn leads to stickiness. It appears probable that the insoluble particles of the invention do contain water soluble polymer. However the particles can be regarded as insoluble since, during normal conditions of use, the amount of water in the plant growth composition will be insufficient to leach a significant amount of soluble polymer out of and away from the particles.

The plant growth composition may be made by adding the particulate material to the porous growth medium. A wide variety of growth media may be used. A synthetic growth medium, such as a slab of hydrophilic mineral wool, may be used but preferably the growth medium is particulate, for instance peat, soil or sand. The composition may be used as a potting composition, for instance for pots or boxes, or the polymeric particles may be added to the ground and dug into the surface soil.

The invention is of particular value when the porous growth medium is sand, sandy soil, or other medium that, without the addition of polymeric material, would have very poor water retention properties. Although the particles do give an improvement when added to, for instance, good quality compost the improvement is much more marked, especially when the cross linking level is below 100 ppm, when the growth medium is a poor material such as sand or other desert soil. The invention is of particular value where seeds are planted in soils which do not receive regular water supply.

The composition may consist solely of the homopolymer or the polymer may be blended with nutrient or other components useful for plant growth.

The amount of polymer to be added to the growth medium will depend upon the growth medium and the conditions of use but is generally in the range 0.1 to 5%, most preferably 0.1 to 1% by weight.

For use in the subsequent Examples (which illustrate the utility of the invention) a range of cross-linked polyacrylamides was prepared by adding a suitable amount of methylenebisacrylamide to a 25% aqueous acrylamide solution at pH4–6. While purging with nitrogen, 1 ppm of $Fe^{2+}$ (added as ferrous ammonium sulphate) and 50 ppm ammonium persulphate were then added (based on monomer). Polymerisation proceeded. The resultant gels were either slurried in acetone using a mechanical disintegrator and the particles removed and dried, or they were disintegrated directly and dried. Both methods gave particles in the size range 0.5 to 5.0 mm.

EXAMPLES 1–6

Each of the products, with differing cross linker levels, was mixed with John Innes seedling compost at a rate of 20 g/l. Radish seeds were planted in each pot and all pots received equal volumes of water initially and during subsequent waterings. After ten days, the samples were examined and seedling height measured. Table 1 gives the results (PAM is polyacrylamide and MBA is methylenebisacrylamide).

TABLE 1

| Example No. | MBA (ppm) | Seedling height after 10 days (cm) | % improvement |
|---|---|---|---|
| 1 | No polymer added | 9.5 | 0 |
| 2 | 0 (Soluble PAM) | 8.2 | −7.3 |
| 3 | 50 | 14.3 | 50.5 |
| 4 | 500 | 12.2 | 28.4 |
| 5 | 5,000 | 10.3 | 8.4 |
| 6 | 50,000 | 10.2 | 7.3 |

EXAMPLES 7–11

The polymers of Examples 3 and 6 were examined at polymer addition levels of 3 and 15 g/l. Five 7.5 cm diameter pots were filled with John Innes compound containing the polymer, and radish seeds were planted. The pots were placed under artificial light. 100 mls of water were added. 25 ml aliquots of water were added to each at 3 day intervals. The seedlings were inspected after 10 and 16 days for height. The results are given in Table 2.

TABLE 2

| Example | MBA (ppm) | Dose Level (g/l) | Seedling Height (cm) 10 days | Seedling Height (cm) 16 days |
|---|---|---|---|---|
| 7 | No polymer added | — | 6.4 | 10.7 |
| 8 | 50 | 3 | 6.5 | 11.9 |
| 9 | 50 | 15 | 7.7 | 12.0 |
| 10 | 50,000 | 3 | 4.4 | 9.7 |
| 11 | 50,000 | 15 | 3.1 | 7.0 |

EXAMPLES 12–21

These tests were designed to evaluate the water-retention ability of the polymers in good and poor soils. The good soil was John Innes seedling compost and the poor soil sand. The time taken for radishes to wilt after a final watering was recorded. Polymer was added to 20 g/l and equal volumes of water were added at regular intervals until plants had reached a four-leaf stage. Watering was then discontinued and the time for the seedlings to wilt was recorded. The results are shown in Table 3.

| Example No. | MBA (ppm) | Soil | Time to wilt (days) |
|---|---|---|---|
| 12 | No polymer added | John Innes | 11 |
| 13 | 50 | " | 18 |
| 14 | 500 | " | 14 |
| 15 | 5,000 | " | 13 |
| 16 | 50,000 | " | 11 |
| 17 | No polymer added | Sand | 11 |
| 18 | 50 | " | 18 |
| 19 | 500 | " | 11 |
| 20 | 5,000 | " | 11 |
| 21 | 50,000 | " | 11 |

EXAMPLE 22

A series of tests on the growth of radish seedlings were conducted using acrylamide homopolymer cross linked with 50, 500 or 5000 ppm methylenebisacrylamide and with copolymers of 90% acrylamide and 10% sodium acrylate or 70% acrylamide and 30% sodium acrylate again with 50, 500 or 5000 ppm methylenebisacrylamide. Seedling growth in the same growth medium but without the addition of any polymer was also observed. All the tests with acrylamide homopolymer gave better growth than the control. All the tests with acrylamide acrylic acid copolymers gave worse results and indeed there was no seedling growth at all with the 90:10 copolymer cross linked with 50 ppm or the 70:30 copolymers cross linked with 50, 500 or 5000 ppm cross linking agent. The homopolymers cross linked with 50 and 500 ppm gave best seedling growth, with optimum results being achieved with 50 ppm cross linking agent and a particle size below 335 microns.

EXAMPLE 23

A range of non-ionic acrylamide polymers was made, varying in MBA level from 0 to 50,000 ppm.

To a series of pots was added a mixture of each polymer in turn (1.6 g) and sand (200 g). In each pot was planted 10 radish seeds. The whole experiment was replicated.

Watering was carried out on each of days 1 to 4 of the experiment. In each case water was added until it began to drain from the bottom of the pot, and then the pot was weighed. After 4 days, each pot had reached its field capacity. The field capacity is the amount of water absorbed by the medium, including the polymer.

After day 4, the pots were allowed to dry out and weighed at frequent intervals. The wilting time of the radish was recorded and for each pot, the water content when 50% of the radish wilted was found. The value recorded, termed the wilt point, is an indication of the amount of water maintained by the polymer and that is unavailable to the seedlings. The critical property of the polymer is the available water content, obtained by subtracting the wilt point from the field capacity. The results are shown below:

| Product (ppm MBA) | Field Capacity (gm water) | Wilt Point (gm water) | Available Water (gm) = (F.C. − W.P.) | % increase over control |
|---|---|---|---|---|
| Control (sand) | 46.0 | 4.4 | 41.6 | 0 |
| 0 | 51.7 | 13.8 | 37.9 | −8.9 |
| 25 | 73.2 | 22.5 | 50.7 | 21.9 |
| 50 | 84.2 | 18.7 | 65.5 | 57.5 |
| 200 | 75.5 | 16.3 | 59.2 | 42.3 |
| 500 | 70.0 | 10.7 | 59.3 | 42.5 |
| 5,000 | 61.6 | 8.8 | 52.8 | 26.9 |
| 50,000 | 51.9 | 5.0 | 46.9 | 12.7 |

I claim:

1. A plant growth composition comprising a porous growth medium into which has been incorporated a particulate substantially non-ionic polyacrylamide containing 0 to 2% molar ionic groups, said polyacrylamide cross-linked by 30 to 100 ppm by weight polymer of cross-linking agent.

2. A medium according to claim 1 in which the amount of cross linking agent is 30 to 80 ppm.

3. A medium according to claim 1 in which the amount of cross linking agent is about 50 ppm.

4. A medium according to claim 1 in which the cross linking agent is methylenebisacrylamide.

5. A medium according to claim 1 in which the particles are mainly from 0.05 to 1 mm in size.

6. A medium according to claim 1 in which the particles are mainly from 0.05 to 0.5 mm in size.

7. A composition according to claim 1 in which the porous growth medium is selected from the group consisting of sand, sandy soil, and hydrophilic mineral wool.

8. A composition according to claim 1 in which the substantially non-ionic polyacrylamide contains up to 1 weight percent ionic groups and the amount of cross-linking agent is about 50 ppm.

9. A method in which plants are grown in a plant growth composition comprising a porous growth medium into which has been incorporated a particulate substantially non-ionic polyacrylamide containing 0 to 2% molar ionic groups said polyacrylamide cross-linked by 30 to 100 ppm by weight polymer of cross-linking agent.

10. A method according to claim 9 in which the amount of cross-linking agent is from 30 to 80 ppm.

11. A method according to claim 9 in which the amount of cross-linking agent is about 50 ppm.

12. A method according to claim 9 in which the cross-linking agent is methylenebisacrylamide.

13. A method according to claim 3 in which the particles are mainly from 0.05 to 1.0 mm in size.

14. A method according to claim 9 in which the particles are mainly from 0.05 to 0.5 mm in size.

15. A method according to claim 9 in which the porous growth medium is selected from the group consisting of sand, sandy oil, and hydrophilic mineral wool.

16. A method according to claim 9 in which the substantially non-ionic polyacrylamide contains up to 1 weight percent ionic groups and the amount of cross-linking agent is about 50 ppm.

17. A method in which plants are grown in a plant growth composition comprising a porous growth medium selected from sand, sandy soil and hydrophilic mineral wool and into which has been incorporated a particulate, substantially non-ionic polyacrylamide containing 0 to 2% ionic groups said polyacrylamide cross-linked with 30 to 100 ppm cross-linking agent and in which the plant growth composition is watered and is then allowed to dry to a water content (outside the particulate polyacrylamide) at which plants would wilt in the absence of the particulate polyacrylamide and in which the plants draw water from the particulate polyacrylamide and thereby avoid wilting.

18. A method according to claim 17 in which the plant growth composition contains 0.1 to 5 weight percent of the particulate, substantially non-ionic polyacrylamide.

* * * * *